June 20, 1967 F. FREEMAN ET AL 3,325,997
GAS TURBINE ENGINE
Filed June 24, 1965 2 Sheets-Sheet 1
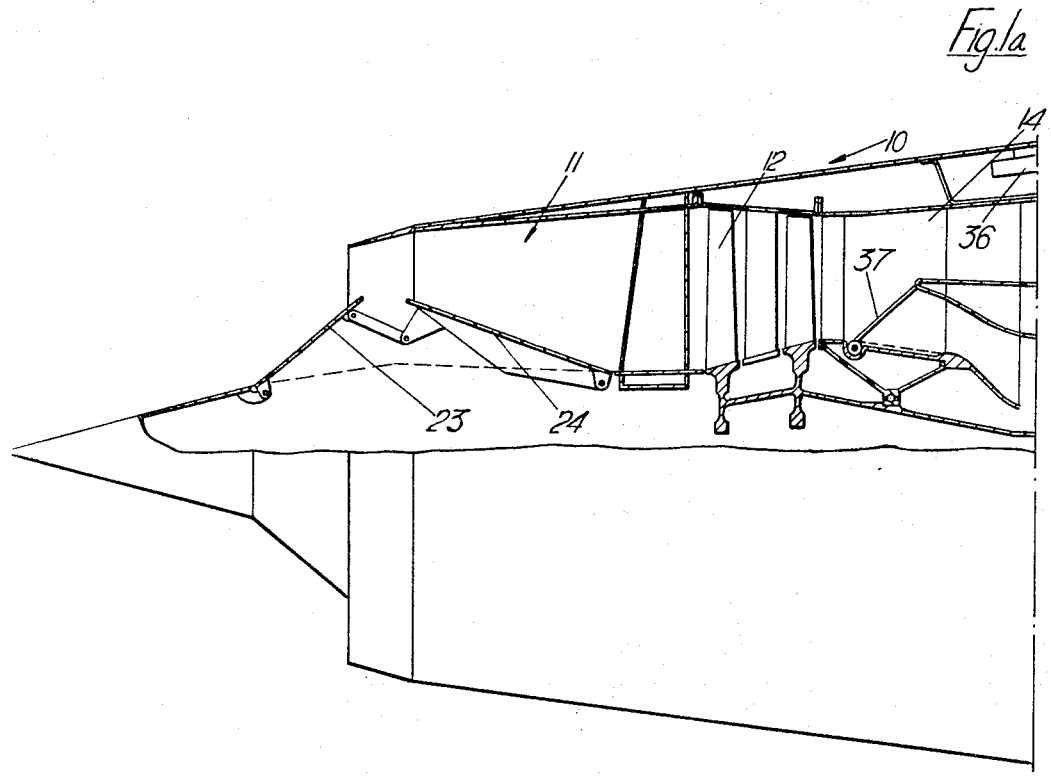
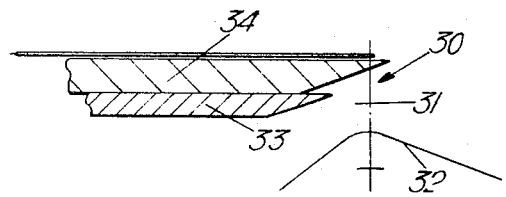
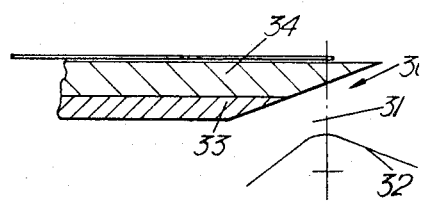

June 20, 1967  F. FREEMAN ET AL  3,325,997
GAS TURBINE ENGINE
Filed June 24, 1965  2 Sheets-Sheet 2
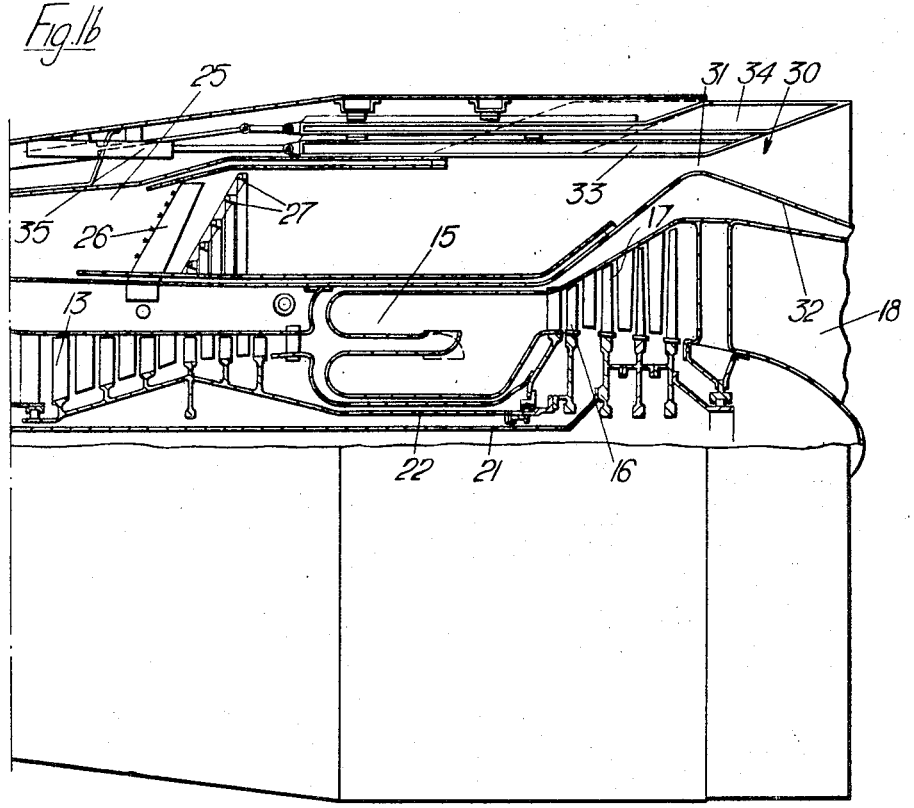
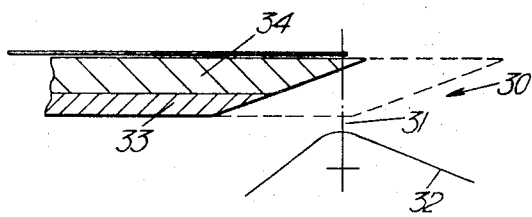

United States Patent Office 3,325,997
Patented June 20, 1967

3,325,997
GAS TURBINE ENGINE
Frederick Freeman, Derby and Allen Geoffrey Downhill, Mickleover, Derby, England, assignors to Rolls-Royce Limited, Derby, England, a British company
Filed June 24, 1965, Ser. No. 466,557
Claims priority, application Great Britain, Aug. 4, 1964, 31,670/64
6 Claims. (Cl. 60—226)

ABSTRACT OF THE DISCLOSURE

A gas turbine by-pass engine operable both as a turbo-jet and as a ram-jet, having a main flow duct and a by-pass duct which receive air from an upstream compressor, a valve which selectively allows the air from the compressor to pass into the main flow duct and the by-pass duct or to entirely by-pass the main flow duct and flow only into the by-pass duct which has a variable area nozzle comprising a movable outer casing having relatively movable inner and outer parts, and a fixed inner casing.

This invention concerns a gas turbine engine which is adapted for use both as a turbo-jet and a ram-jet.

According to the present invention, there is provided a gas turbine engine having an intake, compressor means, first combustion equipment, turbine means and a first nozzle, all arranged in flow series, a by-pass passage which is arranged to receive air compressed by the compressor means and which by-passes the first combustion equipment, the turbine means and the first nozzle, the by-pass passage having second combustion equipment mounted therein and being provided at its downstream end with a second nozzle whose effective throat area can be varied, the nozzle having a fixed inner casing and a movable outer casing having axially relatively movable inner and outer parts relative movement of which adjust the effective throat area of the second nozzle, and a valve which may be opened and closed so as respectively to permit and prevent air which has been compressed by the compressor means from passing to the first combustion equipment, turbine means, and first nozzle.

The first nozzle is preferably a fixed nozzle.

The intake is preferably a variable area intake.

Preferably the compressor means comprise a low pressure compressor and a high pressure compressor the space between which communicates with the by-pass passage, the said valve being mounted in said space.

Preferably both the inner part and the outer part of the movable outer casing are movable independently of each other, separate power means being provided for effecting the movement of the parts.

The inner and outer parts may comprise axially extending, fully annular, cylindrical members the downstream ends of which are formed with an oblique radial surface.

The invention is illustrated merely by way of example, in the accompanying drawings, in which:

FIGURES 1a and 1b present together a diagrammatic part-sectional view of a gas turbine engine according to the present invention, and FIGURES 2 to 4 are enlarged fragmentary cross-sectional views of a part found in the structure of FIGURE 1b, the views illustrating different positions of the same.

Referring to the drawings, an aircraft (not shown) has a gas turbine engine 10 which is adapted for hypersonic flight (e.g. to Mach 5) and which comprises a variable area intake 11, a two-stage low pressure compressor 12, a six-stage high pressure compressor 13 which is spaced from the low pressure compressor 12 by a space 14, combustion equipment 15, a one-stage high pressure turbine 16, a three-stage low pressure turbine 17, and a fixed nozzle 18, all arranged in flow series. The low pressure compressor 12 and the low pressure turbine 17 are drivingly mounted on a shaft 21, while the high pressure compressor 13 and high pressure turbine 16 are drivingly mounted on a shaft 22 within which the shaft 21 is concentrically disposed.

The variable area intake 11 has flap members 23, 24 which are movable (by power means, not shown) between the full line position shown, in which the intake 11 has its minimum effective throat area, and the dotted line position shown, in which the intake 11 has its maximum effective throat area.

The engine 10 has an annular by-pass passage 25 which communicates with the space 14 and which thus receives air which has been compressed by the low pressure compressor 12. The by-pass passage 25 annularly surrounds and by-passes the high pressure compressor 13, the combustion equipment 15, the turbines 16 and 17, and the fixed nozzle 18.

Mounted in the by-pass passage 25 is combustion equipment comprising fuel injection equipment 26 and a plurality of concentrically arranged, downstream facing, annular gutters 27 which are disposed downstream of the fuel injection equipment 26. Fuel which is carried downstream by the air passing through the by-pass passage 25 is burned at the gutters 27.

Mounted at the downstream end of the by-pass passage 25 is a nozzle 30 the effective area of whose throat 31 can be varied. The nozzle 30 has a fixed inner casing 32 and an outer casing made up of axially movable annular inner and annular outer parts 33, 34, and the downstream ends of which are formed with an oblique radial surface. Rams 35, 36 are provided for respectively effecting axial movement of the inner and outer parts 33, 34 whereby to adjust the effective throat area and the shape of the nozzle 30, A flap valve 37 is mounted in the space 14. The flap valve 37 is movable (by powers means, not shown) between an open position (shown in dotted lines) in which air which has been compressed in the low pressure compressor 12 may pass to the high pressure compressor 13 and so to the combustion equipment 15, turbines 16, 17 and nozzle 18, and a closed position (shown in full lines) in which the said air is prevented from so passing and is directed only into the by-pass passage 25. It will be appreciated that when the flap valve 37 is respectively opened and closed, the engine 10 may respectively be employed as a turbo-jet and as a ram-jet.

At take-off, the flap members 23, 24 are disposed in their dotted line position to give maximum throat area at the intake 11, the flap valve 37 is open both combustion equipments 15 and 26, 27 are in operation, although the combustion equipment 26, 27 is not supplied with a great deal of fuel, and the nozzle 30 is arranged as shown in FIGURE 2. That is to say, the outer part 34 of the nozzle 30 is fully retracted and the inner part 33 thereof is partially extended to give the throat 31 an area suitable for the small amount of fuel being burned in the by-pass passage 25. At take-off, the fuel supply to the combustion equipment 15 will be at its maximum.

During subsonic climb, the flap members 23, 24 and the flap valve 37 remain unchanged in position, and the fuel supply to the combustion equipment 15 remains at its maximum. The fuel supply to the combustion equipment 26, 27, however, is gradually increased, and the area of the throat 31 is correspondingly increased. In order to avoid a sudden variation in the said area, the outer part 34 is first extended until, as shown in FIGURE 3, its end surface is aligned with that of the inner part 33, after which the parts 33, 34 are retracted together towards the full line position shown in FIGURE 4. When the parts 33, 34 have reached the said full line position, they will have been fully retracted to give the throat 31 its maximum area. The maximum fuel supply will at this time be sent to the combustion equipment 26, 27, and the aircraft will be undergoing transonic acceleration.

During supersonic climb, the parts 33, 34, as the Mach number increases, are gradually extended together, towards the dotted line position shown in FIGURE 4, so as to reduce the area of the throat 31 to suit the Mach number variation. At the same time, the flap members 23, 24 are gradually moved towards the full line position so as to reduce the throat area of the intake 11. Up to a speed of about, say, Mach 3, the flap valve 37 is left in its open position and the fuel supply to the combustion equipment 15 remains unaltered. At higher speeds, however, the flap valve 37 is closed, and the fuel supply to the combustion equipment 15 is shut off, the fuel supply to the combustion equipment 26, 27 being maintained at its maximum. The low pressure compressor 12 will then no longer be positively driven but will "windmill." The engine 10 will thus function as a ram-jet.

When, the maximum speed (e.g. Mach 5) is reached, the throat area of the intake 11 and the area of the throat 31 will both be at their minimum.

During descent, the flap members 23, 24 are gradually moved towards their dotted line position so as to increase the throat area of the intake 11, while the parts 33, 34 are moved towards the full line position shown in FIGURE 4. At a speed of about, say, Mach 3, the flap valve 37 is opened and fuel is supplied to the combustion equipment 15, whereby the engine functions as a by-pass turbojet engine. The fuel supply to the combustion equipment 26, 27 is then gradually reduced to zero.

During stand-off and subsonic cruise, the flap members 23, 24 are disposed in their dotted line positions, the flap valve 37 is open, the fuel supply to the combustion equipment 26, 27 is shut down and that to the combustion equipment 15 is adjusted to produce the requisite thrust. The outer part 34 of the nozzle 30 is at this time fully retracted, the inner part 33 being positioned to give the throat 31 the required area.

As will now be appreciated from the heretofore description of FIGURES 2, 3 and 4 with respect to the various configurations of movement of the parts 33 and 34, the pilot by independently controlling the parts 33 and 34 has extremely accurate and flexible control of the throat area without danger of too sudden variations in this area. The extremely smooth and fine variance of the nozzle outlet area eliminates the problems of the prior art where the variance of the outlet area could occur too suddenly resulting in sudden increases in fuel flow and engine speed.

We claim:

1. A gas turbine engine having an intake, compressor means, first combustion equipment, turbine means, and a first nozzle, all arranged in flow series, a by-pass passage which receives air compressed by the compressor means and which by-passes the first combustion equipment, the turbine means and the first nozzle, second combustion equipment mounted in said by-pass passage, a second nozzle, whose effective throat area can be varied, mounted at the downstream end of the by-pass passage, the second nozzle having a fixed inner casing and a movable outer casing, said outer casing including inner and outer parts being axially relatively movable independently and selectively of each other, relative movement of which adjusts the effective throat area of the second nozzle, and a valve which may be opened and closed so as respectively to permit and prevent air which has been compressed by the compressor means from passing to the first combustion equipment, turbine means and first nozzle.

2. A gas turbine engine as claimed in claim 1 in which the first nozzle is a fixed nozzle.

3. A gas turbine engine as claimed in claim 1 including means to vary the area of said intake.

4. A gas turbine engine as claimed in claim 1 wherein said compressor means comprises a low pressure compressor and a high pressure compressor having a space therebetween, said by-pass passage receiving air from said space and said valve being mounted in said space.

5. A gas turbine engine as claimed in claim 1 including separate power means provided for said inner and said outer parts for effecting independent movement of the same.

6. A gas turbine engine as claimed in claim 1 wherein said inner and outer parts comprise axially extending, fully annular, cylindrical members the downstream ends of which are formed with an oblique radial surface.

References Cited

UNITED STATES PATENTS

| | | | |
|---|---|---|---|
| 2,518,498 | 8/1950 | Schulte | 60—224 |
| 2,589,548 | 3/1952 | Imbert | 60—224 |
| 2,672,726 | 3/1954 | Wolf | 60—225 |
| 2,857,740 | 10/1958 | Hall | 60—225 |
| 3,013,385 | 12/1961 | Kerry | 60—262 |
| 3,016,698 | 1/1962 | Sobey | 60—262 |
| 3,060,679 | 10/1962 | Schmitt | 60—224 |

MARK NEWMAN, *Primary Examiner.*

D. HART, *Assistant Examiner.*